United States Patent
Zhou

(10) Patent No.: US 10,417,480 B2
(45) Date of Patent: Sep. 17, 2019

(54) METHOD FOR CONTROLLING UNLOCKING AND TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 303 days.

(21) Appl. No.: 15/603,878

(22) Filed: May 24, 2017

(65) Prior Publication Data
US 2017/0344801 A1    Nov. 30, 2017

(30) Foreign Application Priority Data

May 30, 2016 (CN) .......................... 2016 1 0375533

(51) Int. Cl.
*G06K 9/62* (2006.01)
*G06K 9/00* (2006.01)
*G06F 21/32* (2013.01)

(52) U.S. Cl.
CPC ......... *G06K 9/00087* (2013.01); *G06F 21/32* (2013.01); *G06K 9/001* (2013.01); *G06K 9/0002* (2013.01); *G06K 9/00026* (2013.01); *G06K 9/00067* (2013.01); *G06K 9/00073* (2013.01); *G06K 9/00093* (2013.01)

(58) Field of Classification Search
CPC .......................... G06K 9/00087–9/001; G06K 9/00006–9/0012; G06F 21/32
See application file for complete search history.

(56) References Cited

U.S. PATENT DOCUMENTS

| | | |
|---|---|---|
| 2002/0048390 A1 | 4/2002 | Ikegami |
| 2005/0238214 A1 | 10/2005 | Matsuda et al. |
| 2013/0169780 A1 | 7/2013 | Wu |

FOREIGN PATENT DOCUMENTS

EP    1452944 A2 *   9/2004  ............. G06F 21/32

* cited by examiner

*Primary Examiner* — Brian Werner
(74) *Attorney, Agent, or Firm* — Young Basile Hanlon & MacFarlane, P.C.

(57) ABSTRACT

A method for controlling unlocking and a terminal includes the follows. Feature points of class i of a finger of a user is acquired by scanning the finger with the $i^{th}$ scanning partition of a fingerprint recognition sensor of a terminal, the fingerprint recognition sensor has M scanning partitions, M is a positive integer not less than 2 and i is a positive integer not greater than M. The acquired feature points of class i is added into a current feature point set. A matching process is performed between the current feature point set and a pre-stored fingerprint template. The terminal is unlocked when the current feature point set is matched.

15 Claims, 10 Drawing Sheets

METHOD FOR CONTROLLING UNLOCKING AND TERMINAL

CROSS-REFERENCE TO RELATED APPLICATION(S)

This application claims priority to Chinese Patent Application No. 201610375533.7, filed on May 30, 2016, the content of which is incorporated by reference herein in its entirety.

TECHNICAL FIELD

The present disclosure relates to the field of electronic technology, and particularly to a method for controlling unlocking and a terminal.

BACKGROUND

Fingerprints are patterns formed on finger pulps at tail ends of fingers of human beings by concave-convex skin. The fingerprints of the human beings are formed under the co-action of nature and nurture, and are closely related to human health. Therefore, everybody has fingerprints which are different. The repetition rate of the fingerprints is extremely low to about one over 15 billion, so the fingerprints are known as "body ID". On the basis of this feature of the fingerprints, fingerprints are widely used as information for identity authentication.

For example, fingerprint recognition technology has become a standard configuration for products of mainstream terminal manufacturers. A fingerprint recognition process can be divided into feature extraction, data storage, and image matching. After an original fingerprint image of a human fingerprint is read by a fingerprint recognition sensor, feature point matching is performed between the fingerprint image and a pre-stored registration fingerprint template, and the terminal will be unlocked when the fingerprint image and a pre-stored registration fingerprint template are matched.

Unlocking speed directly affects the efficiency of use of a terminal user. At present, the unlocking speed has become a competitive factor of each manufacturer. How to shorten unlocking time so as to improve the unlocking efficiency has become an important research direction of a person skilled in the art.

BRIEF DESCRIPTION OF THE DRAWINGS

In order to illustrate the technical solutions of the implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Figure 1:
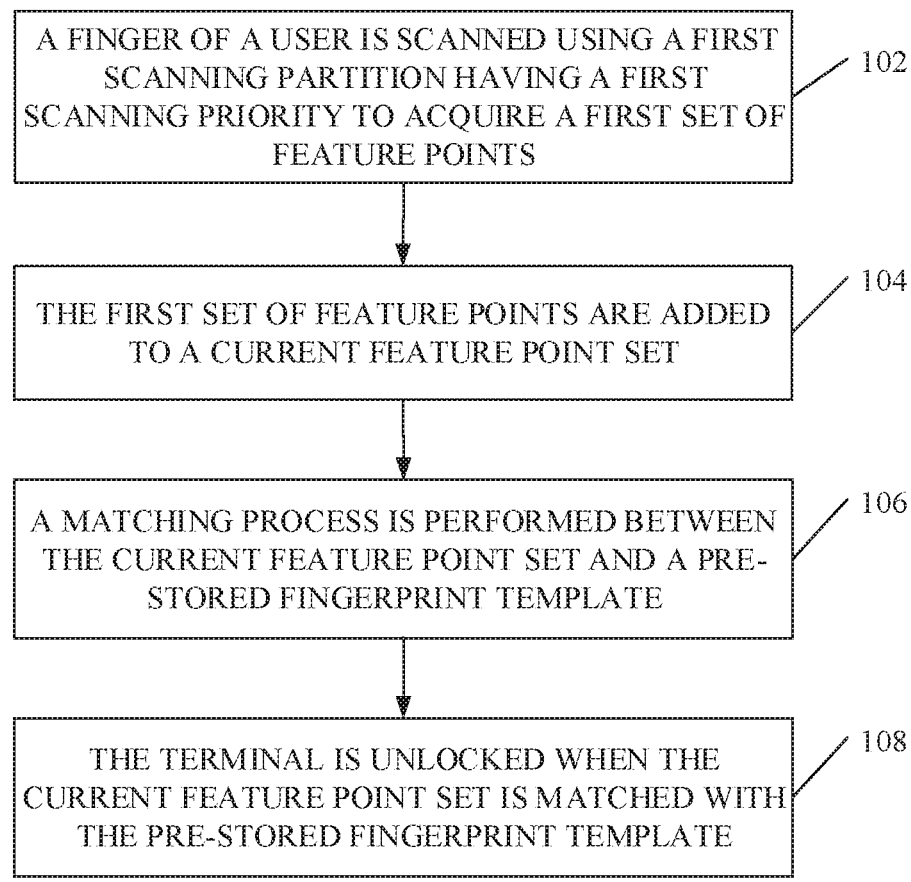
FIG. 1 is a flowchart illustrating a method for controlling unlocking according to an implementation of the present disclosure.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

In the following, some of the terms used herein are explained to facilitate the understanding for those skilled in the art.

Terminal

Terminal, also known as terminal device, terminal equipment or user equipment (UE), means an electronic device that provides voice and/or data connectivity to a user, examples of which can be hand-held devices with wireless connectivity function, on-board devices or the like. Common terminals can be, for example, mobile phones, tablets, laptops, handheld computers, mobile internet devices (MID), or wearable equipment such as smart watches, smart bracelets, and pedometers or others. Terminals in the present disclosure are not only limited to the common terminals, but can also be automated teller machines (ATM), ticket machines, entrance guard machines, medical equipment, or other terminals equipped with fingerprint recognition function.

Fingerprint Recognition Sensor

A fingerprint recognition sensor, also known as a fingerprint recognition module or fingerprint sensor, can realize the recognition of individual fingerprint features through a specific induction sensor. At present, the fingerprint recognition sensor is mainly divided into an optical fingerprint sensor, a capacitive fingerprint sensor, and a radio frequency (RF) fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

Feature

Feature or characteristic refers to fingerprint features of a fingerprint image; the fingerprint feature includes overall features and local features. The overall features in turn include basic pattern patterns such as loop, arch, and whorl. The local features, also known as minutiae, node, or feature point, generally refer to an individual portion of the fingerprint or information representative thereof. Two fingerprints often have the same overall features, however, their local features, that is, the minutiae, cannot be exactly the same. Prints of a fingerprint are not continuous, smooth, or straight, but often break, bifurcated, or curved. These break points, bifurcation points, and turning points are called "minutiae", which can provide confirmation information of the uniqueness of a fingerprint. Minutiae on a fingerprint have the following four different properties. 1) ending, means an end of a print; 2) bifurcation, means the splitting of a print into two or more than two prints; 3) ridge divergence, means the separating of two parallel prints; 4) dot or island, means a particularly short print that become a little dot; 5) enclosure, means a small ring formed when a print separated into two prints and these two prints immediately merged into one. Fingerprint feature data still includes the follows: 1) short Ridge, means a print which is short but not so short to be a little dot; 2) orientation, means that a minutiae point can toward a certain direction; 3) curvature, describes the speed at which the orientation of a print changes; 4) position, which is described via (x, y) coordinates, can be absolute, or can be inductively recognized relative to triangular points or minutiae.

Fingerprint Template

Figure 10:
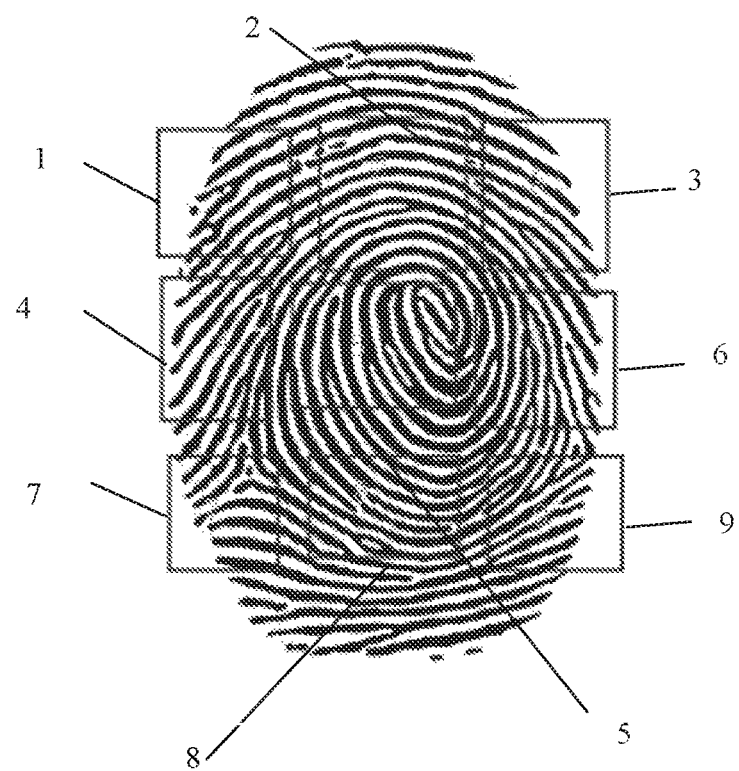
FIG. 10 is a structure schematic diagram illustrating a fingerprint template according to an implementation of the present disclosure.

The term "fingerprint template" and variants thereof, generally refers to a substantially complete fingerprint, or information representative thereof, collected from one or more nodes of a finger. For example, when a fingerprint function of a terminal such as a mobile phone is enabled for the first time, the user may be asked to undergo a fingerprint registration process; during the fingerprint registration, the user put his or her finger on a fingerprint sensor for fingerprint image acquisition or receiving by the fingerprint sensor, and fingerprint images received will be stored as a fingerprint template, usually, one finger corresponds to one fingerprint template; generally, the fingerprint sensor may receive 10-20 times for each finger in order to receive the whole or mostly available fingerprint face and generate a comprehensive fingerprint template. Feature information can be obtained from the fingerprint image received, and for example, the fingerprint template can be saved in the form of image. FIG. 10 illustrates an exemplary fingerprint template, and the numbers marked in the fingerprint of FIG. 10 refers to minutiae.

Besides, the terms "a plurality of" or "multiple" means two or more than two. The term "and/or" is used to describe the association of associated objects and indicates that there can be three relationships. For example, "A and/or B" means three situations, that is, A alone, both A and B, or B alone. The character "/" generally indicates that the associated objects before and after the character are in an "OR" relationship.

Implementations of the present disclosure will be described in detail below with reference to the accompanying drawings.

According to an implementation of the present disclosure, there is provided a method for controlling unlocking, in which at the beginning of an unlocking process, only one scanning partition of a fingerprint recognition sensor is used to scan a finger of a user to acquire feature points for matching. Generally, the first scanning partition to be used is the one with the highest matching priority among all scanning partitions of the fingerprint recognition sensor. When a current feature point set containing the acquired feature points is not matched with a pre-stored fingerprint template, or in parallel with the matching process of the current feature point set, another scanning partition having a lower matching priority is used to scan the finger and acquire another set of feature points, which will be added into the current feature point set to update the current feature point set for subsequent matching. The unlocking process is repeated in the manner described above based on matching priorities of the scanning partitions, until the current feature point set is matched successfully.

Refer to FIG. 1. FIG. 1 is a method for controlling unlocking according to an implementation of the present disclosure. As illustrated in FIG. 1, the method can begin at block 102.

At block 102, a finger of a user is scanned through a first scanning partition having a first matching priority of a fingerprint recognition sensor of a terminal to acquire a first set of feature points; the fingerprint recognition sensor has at least two scanning partitions. At the beginning of each unlocking procedure, the first scanning partition can be the one having the highest matching priority. For example, this operation can be initiated when a touch operation is detected or when the finger contacts the fingerprint recognition sensor of the terminal.

At block 104, the first set of feature points are added to a current feature point set.

At block 106, a matching process is performed between the current feature point set and a pre-stored fingerprint template.

At block 108, the terminal is unlocked when the current feature point set is matched with the pre-stored fingerprint template.

As an implementation, the method can further include the follows.

The finger is scanned through a second scanning partition having a second matching priority lower than the first matching priority, to acquire a second set of feature points; the second set of feature points are added to the current feature point set. The current feature point set updated in such way can be used for subsequent matching. This operation can be performed when the current feature point set updated with the first set of feature points (that is, the current feature point containing the first set of feature points) is not matched with the pre-stored fingerprint template, or can be performed in parallel with the matching of the current feature point set updated with the first set of feature points.

The priority of each scanning partition is determined based on the total number of feature points contained in a plurality of local fingerprint image corresponding to the scanning partition of a plurality of fingerprint images. The scanning partition with a higher matching priority is more likely to acquire feature points that are readily to be matched successfully.

It will apparent to those skilled in the art that, the term "first scanning partition" or "second scanning partition" is a generic term rather than a specific or fixed scanning partition, in contradistinction, it can refer to any scanning partition of the fingerprint recognition sensor and may change during an unlocking procedure.

Figure 2:
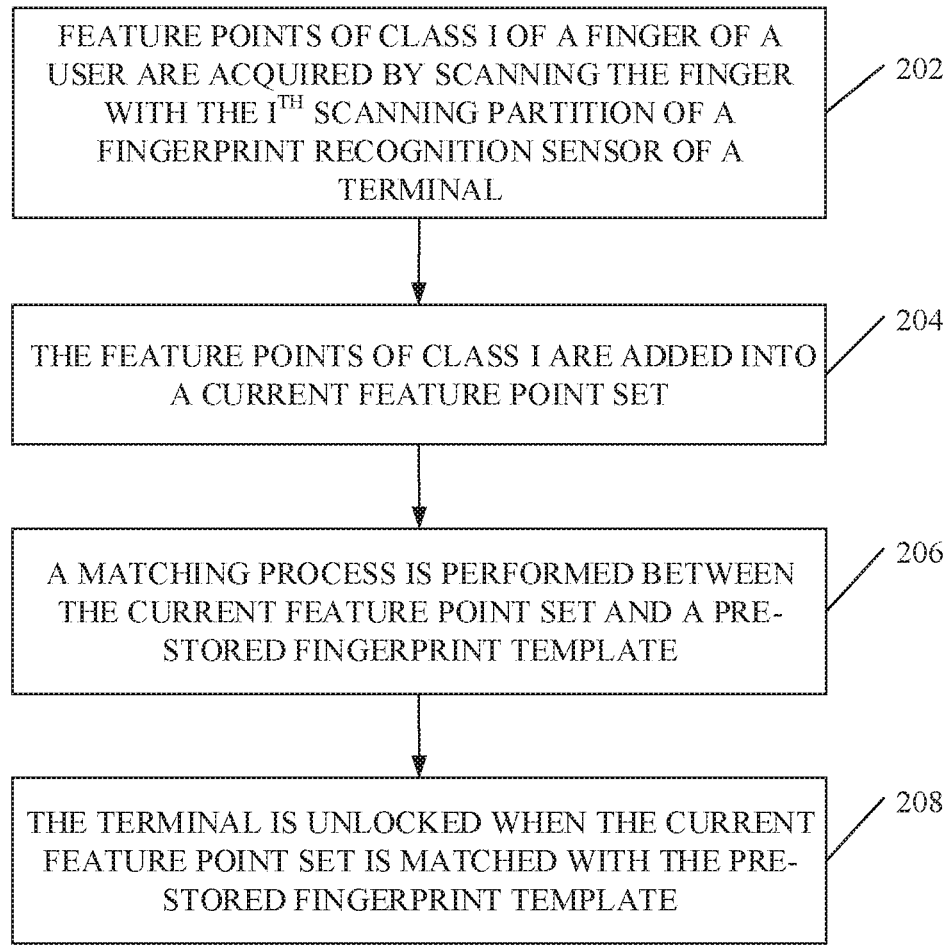
FIG. 2 is a flowchart illustrating another method for controlling unlocking according to an implementation of the present disclosure.

FIG. 2 is a flowchart illustrating another method for controlling unlocking according to an implementation of the present disclosure. As illustrated in FIG. 2, the method can begin at block 202.

At block 202, feature points of class i of a finger of a user are acquired by scanning the finger with the $i^{th}$ scanning partition of a fingerprint recognition sensor of a terminal. The terminal is in a screen-off state or a screen-on and screen lock state. The $i^{th}$ scanning partition used for scanning at the beginning of this method may be a scanning partition having the highest matching priority.

Scanning Partition

The fingerprint recognition sensor has M scanning partitions, M being a positive integer not less than 2 and i being a positive integer not greater than M. From another perspective, the fingerprint recognition sensor has a multi-row and multi-column sensing electrode array such as a 192-row and 56-column sensing electrode array. Correspondingly, each of the M scanning partitions includes sensing electrodes located therein.

As one implementation, each of the M scanning partitions has a plurality of sensing electrodes, the number of which is greater than a first preset threshold, so as to ensure that enough feature points can be acquired for matching. Generally speaking, when the terminal is susceptible to fingerprint unlocking, after a fingerprint image is generated according to fingerprint data collected by the fingerprint recognition sensor, the image should generally include at least about 20 feature points; when the terminal matches the 20 feature points successfully, the identity of the user may be determined and an unlocking operation may be executed. That is to say, each of the M scanning partitions should be able to collect about 20 or more items of fingerprint data, namely when the number of sensing electrodes in each of the M scanning partitions is greater than or equal to 20, it is possible to extract at least 20 feature points from a fingerprint scanned by a corresponding scanning partition accordingly. To this end, each of the scanning partitions includes at least about 20 sensing electrodes.

In addition, generally, the degree of recognition for scanning the finger via sensing electrodes in an intermediate region of the sensing electrode array is higher than the degree of recognition for scanning the finger via an edge region of the sensing electrode array, therefore, in at least one implementation, the sensing electrodes corresponding to the M scanning partitions do not include edge sensing electrodes in the sensing electrode array of the fingerprint recognition sensor. The edge sensing electrodes include all sensing electrodes in the first X1 rows and all sensing electrodes in the last X2 rows in the sensing electrode array, X1 and X2 are positive integers. Thus, an invalid time for scanning the finger through the X1-row and X2-row sensing electrodes is reduced or eliminated, thereby facilitating increase of the unlocking speed of the terminal.

It may be understood that the manner for arranging the M scanning partitions may be diverse and will not be uniquely limited to the implementations of the present disclosure. The following provides two manners.

As one implementation, the terminal may provide a partition setting interface for user to set partitions. For example, for the 192-row and 56-column sensing electrode array, specific partition values for equal-area partitioning according to a row number may be provided, and a certain partition value may be selected by the user so as to determine a corresponding quantity of partitions.

As another implementation, in view of strong association between a user fingerprint unlocking event and user's habits, according to a great number of fingerprint unlocking success events, the terminal may count an average quantity of feature points of the finger collected by the fingerprint recognition sensor each time the user succeeds in fingerprint unlocking, and may determine the quantity of partitions according to the calculated average quantity and the minimum quantity (that is, 20) of feature points for fingerprint unlocking. For example, when the counted average quantity of feature points of the finger collected by the fingerprint recognition sensor each time the user succeeds in fingerprint unlocking is 100, the terminal may perform equal-area partitioning according to a row number to divide the sensing electrode array into five partitions (100/20=5).

Acquisition of Feature Points

As to the acquisition of the feature points of class i, for example, the terminal may obtain fingerprint data by scanning the finger with the $i^{th}$ scanning partition, generate a fingerprint image according to the fingerprint data, and extract feature points of the fingerprint image as the feature points of class i.

Fingerprints of a finger contain uneven finger valleys and finger peaks, and therefore the terminal may calculate specific distribution of the finger valleys and the finger peaks according to capacitance values formed between the finger valleys/finger peaks and the sensing electrodes (such as capacitive sensor).

A specific working principle is that, each sensing electrode of the fingerprint recognition sensor is pre-charged to a reference voltage, and when the finger touches an sensing electrode, a distance between the finger peak and an sensing electrode plane and a distance between the finger valley and the sensing electrode plane are different due to the fact that the finger peak is concave and the finger valley is concave. According to a relationship between a capacitance value and a distance, different capacitance values will be formed at the positions of the finger peak and the finger valley. Discharging is performed by utilizing a discharging current. Since the capacitance values corresponding to the finger peak and the finger valley are different, the corresponding discharging speeds are different. The distance between the finger peak and the sensing electrode is short, the capacity is high, and the discharging speed is slow. The distance between the finger valley and the sensing electrode is far, the capacity is low, and the discharging speed is fast. The positions of the finger peak and the peak valley may be determined according to different discharging rates, so as to generate fingerprint data corresponding to the finger.

Further, as an implementation, each scanning partition includes n1 normal sensing electrodes and n2 abnormal sensing electrodes. n2 and n1 are positive integers. The fingerprint data can be obtained is as follows.

n1 underlying data are acquired by means of the n1 normal sensing electrodes in the $i^{th}$ scanning partition. n2 reference underlying data corresponding to the n2 abnormal sensing electrodes are determined according to n1 underlying data acquired by the n1 normal sensing electrodes. The n2 reference underlying data and the n1 underlying data are configured to constitute the fingerprint data.

The manner in which the n2 reference underlying data corresponding to the n2 abnormal sensing electrodes is determined according to the n1 underlying data acquired by the n1 normal sensing electrodes is as follows.

Manner 1

The terminal calculates an average value of the n1 underlying data. The terminal determines the average value as the n2 reference underlying data corresponding to the n2 abnormal sensing electrodes. In other words, the terminal may assign the average value to each of the n2 reference underlying data.

As can be seen, the terminal can correct the abnormal underlying data collected by the abnormal sensing electrodes, thereby facilitating improvement of the accuracy of fingerprint data and improving the security of unlocking.

Manner 2

The terminal acquires a coordinate value of each abnormal sensing electrode in the n2 abnormal sensing electrodes. The terminal performs an averaging process (also known as mean process or mean treatment) on each abnormal sensing electrode according to the coordinate value of each abnormal sensing electrode and the n1 underlying data to obtain the n2 reference underlying data corresponding to the n2 abnormal sensing electrodes.

The averaging process can be executed as follows. X sensing electrodes in the n1 normal sensing electrodes are determined, the distance between the coordinate value of each of the X sensing electrodes and the coordinate value of an abnormal sensing electrode currently undergoing the averaging process is smaller than a preset distance. An average value of X underlying data corresponding to the X sensing electrodes is calculated. The calculated average value is determined as a reference underlying data value of the abnormal sensing electrode currently undergoing the averaging process, where X is a positive integer.

As can be seen, the terminal can correct the abnormal underlying data collected by the abnormal sensing electrodes, thereby facilitating improvement of the accuracy of fingerprint data and improving the security of unlocking.

At block 204, the feature points of class i are added into a current feature point set. The current feature point set is established at the beginning of the unlocking process, and can be updated whenever the finger is scanned. The current feature point mentioned at block 204 can contain other previous feature points acquired via other scanning partitions having higher matching priority than the $i^{th}$ scanning partition of the fingerprint recognition sensor.

At block 206, a matching process is performed between the current feature point set and a pre-stored fingerprint template. One example of the fingerprint template is illustrated in FIG. 10.

A block 208, the terminal is unlocked when the current feature point set is matched with the pre-stored fingerprint template. For example, the terminal may calculate the matching degree between each feature point in the current feature point set and the pre-stored fingerprint template, when the number of target feature points in the current feature point set is greater than a second preset threshold, the terminal determines that the current feature point set is successfully matched with the pre-stored fingerprint template. The target feature point refers to a feature point having a matching degree greater than a preset matching degree.

When the terminal is unlocked, a system application desktop of the terminal may be loaded, or, an application interface of an application interrupted by a previous screen-off operation of the terminal may be loaded. The present disclosure is not limited thereto.

As can be seen, by means of the method for controlling unlocking of the present disclosure, the area of the scanning partition for scanning the finger is reduced, and time consumed for scanning is correspondingly shortened as well, thereby facilitating increase of the unlocking speed of the terminal and improving user experience.

Figure 3:
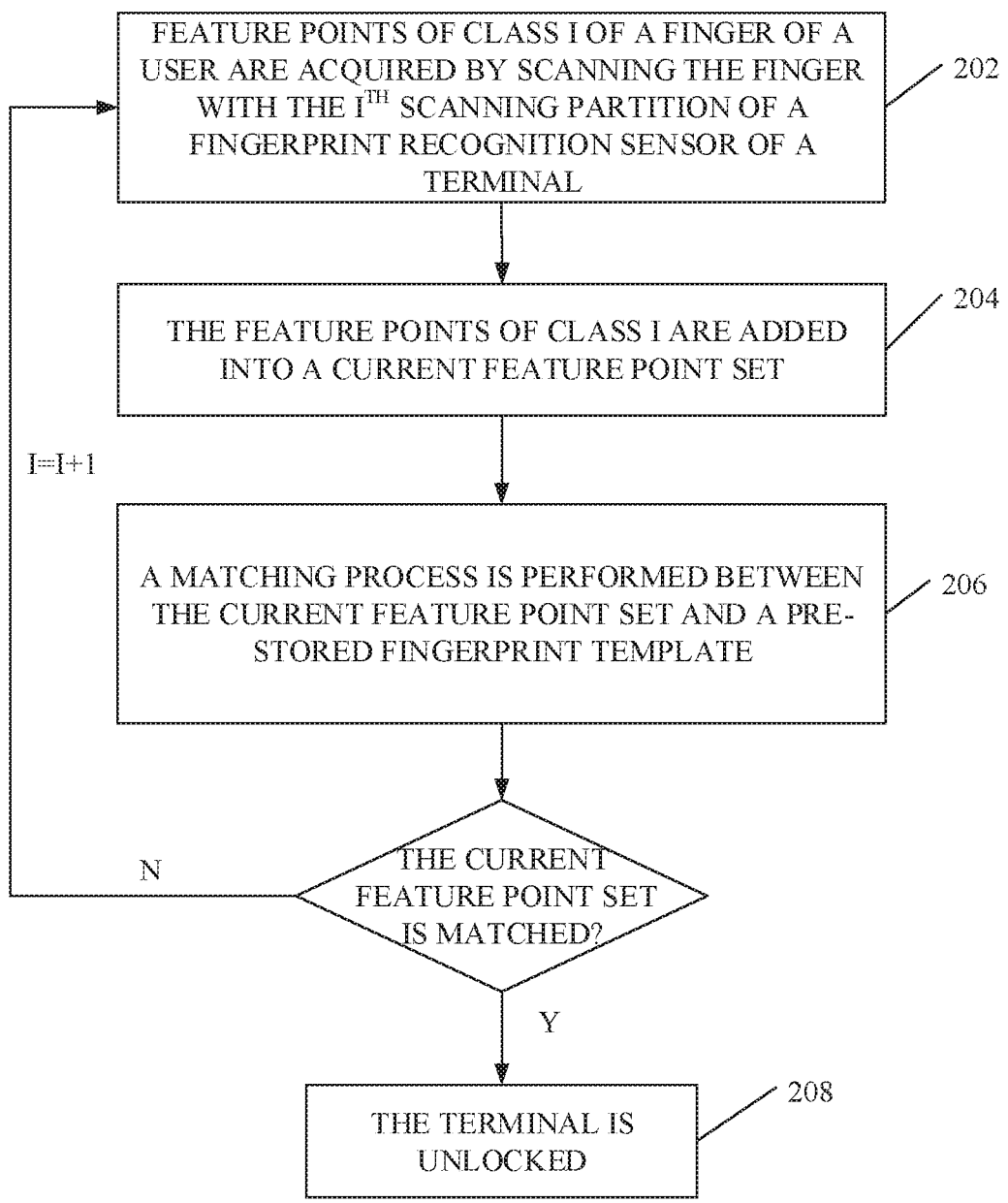
FIG. 3 and FIG. 4 are flowcharts illustrating a scanning operation of the method of FIG. 2.
Figure 4:
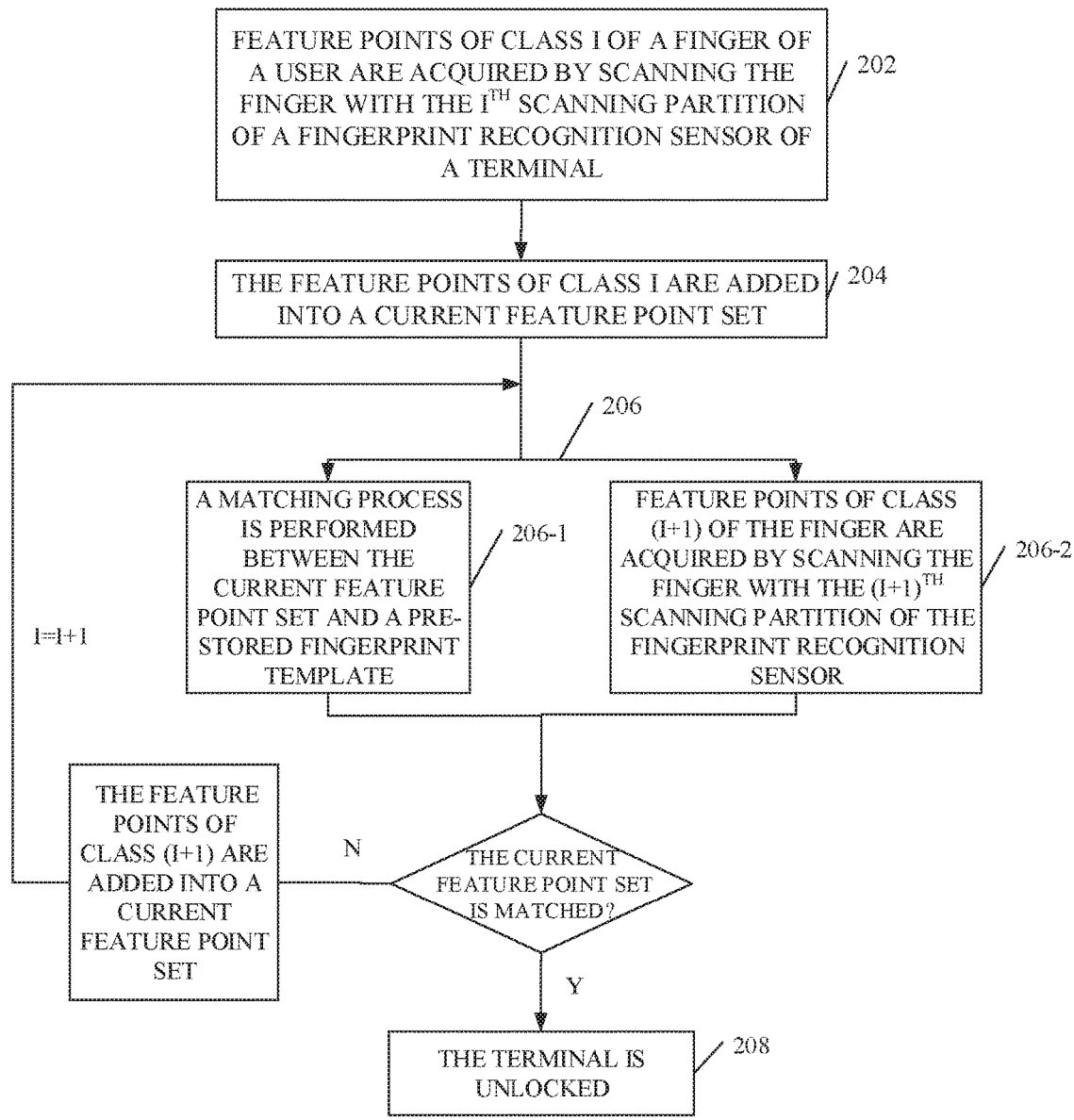

On the basis of the method illustrated above, the method of FIG. 2 can further include the following operations as illustrated in FIG. 3 and FIG. 4, that is, the $(i+1)^{th}$ scanning partition of the fingerprint recognition sensor is used to scan the finger. Feature points of class i+1 of the finger are acquired by scanning the finger with the $(i+1)^{th}$ scanning partition of the fingerprint recognition sensor, where the $i^{th}$ scanning partition has a higher matching priority than the $(i+1)^{th}$ scanning partition.

It should be noted that, the above process can be performed when the matching process of block 206 is failed. As illustrated in FIG. 3, when the current feature points set containing the feature points of class i is not matched, i=i+1, that is, the $(i+1)^{th}$ scanning partition will be used, and the process returns to block 202 to scan the finger with the $(i+1)^{th}$ scanning partition.

Alternatively, the above process can be performed during or in parallel with the matching operation performed at block 206. As illustrated in FIG. 4, in parallel with the operation of matching the current feature point set containing the feature points of class i of block 206-1, at block 206-2, the $(i+1)^{th}$ scanning partition is used to scan the finger to acquire feature points of class i+1 in parallel. When the matching at block 206-1 is failed, the feature points of class i+1 are added into the current feature point set to update the current feature point set for subsequent matching; besides, i is set to i+1 (i=i+1) and the process returns to block 206, that is, the $(i+2)^{th}$ scanning partition is used to scan the finger to acquire feature points of class i+2, and using the current feature point set containing feature points of class i+1 for matching. And so on. In FIG. 4, the feature points of class i+1 is added to the current feature point set when the matching at block 206-1 is failed, however, the present disclosure is not limited thereto, for example, the feature points of class i+1 can be added to the current feature point set immediately after the matching at block 206-1 is completed regardless of the result of the matching.

Generally, duration of matching between the fingerprint template and the current feature point set is more than 100 ms, and duration of the operation of scanning the finger by means of a scanning partition of the fingerprint recognition sensor to acquire the feature points of the finger is less than 100 ms. By performing the matching of the current feature point set at block 206-1 and the acquisition of the feature points of class i+1 at block 206-2 in parallel, when the matching process is successful, the acquisition of the feature points of class i+1 will be terminated. When the matching at block 206-1 is failed, that is, unlocking fails through the $i^{th}$ scanning partition, the terminal does not need to take additional time to execute the acquisition of the feature points of class i+1, thereby the unlocking speed of the terminal can be further increased.

One situation is that, when the current feature point set containing the feature points of class i+1 is failed, a scanning partition, which has a matching priority lower than that of the $(i+1)^{th}$ scanning partition but higher than that of other scanning partition never being used for scanning in the current unlocking process, will be selected and used to scan the finger.

It can be seen that, by means of the fingerprint method for controlling unlocking provided in the implementations of the present disclosure, a fingerprint recognition sensor is divided into a plurality of scanning partitions, feature points are acquired by scanning the finger through scanning partitions in descending order of the matching priority so as to update a current feature point set; a matching process is performed between the current feature point set and a fingerprint template, and when the current feature point set is matched, the terminal will be unlocked. Compared with a solution of scanning a finger by means of all regions of the fingerprint recognition sensor in the related art, the unlocking speed of a terminal can be improved.

Matching Priority

In the methods described above, the scanning partitions are selected according to matching priorities, for the determination of the matching priority, the following operations can be conducted at the very beginning, that is, before acquiring the feature points of class i.

The terminal acquires N fingerprint images that unlocked the terminal successfully for N times; each fingerprint image comprising M local fingerprint images corresponding to the M scanning partitions, N being a positive integer. For each of the M scanning partitions, the terminal calculates the total number or average number of feature points in N local fingerprint images of the N fingerprint images, and determines the matching priority of each of the M scanning partitions according to the total number of feature points corresponding thereto.

For example, suppose the fingerprint recognition sensor includes five scanning partitions, namely, scanning partition #1, scanning partition #2, scanning partition #3, scanning partition #4, and scanning partition #5. Correspondingly, each fingerprint image having five local fingerprint images, that is, local fingerprint image #1, local fingerprint image #2, local fingerprint image #3, local fingerprint image #4, and local fingerprint image #5.

One hundred of fingerprint images that unlocked the terminal successfully for one hundred times are acquired, and a total number of feature points in the five local fingerprint images corresponding to the five scanning partitions is counted as, for example, total number of feature points of local fingerprint image #1= the number of feature points of local fingerprint image #1 in fingerprint image #1+ the number of feature points of local fingerprint image #1 in fingerprint image #2+ . . . + the number of feature points of local fingerprint image #1 in fingerprint image #100.

Suppose the result is that, local fingerprint image #1: 110; local fingerprint image #2: 155; local fingerprint image #3: 420; local fingerprint image #4: 170; and local fingerprint image #5: 125.

According to the total number of feature points in the five local fingerprint images, the terminal determines the matching priority of the five scanning partitions in descending order as scanning partition #3, scanning partition #4, scanning partition #2, scanning partition #1, and scanning partition #5. That is, the scanning partition that is likely to be selected for scanning at the beginning of an unlocking process is scanning partition #3, which has the highest matching priority. If the matching with regard to the feature points acquired through scanning partition #3 is failed, scanning partition #4 will be selected next, and so on, until the matching is successful.

By means of the method for controlling unlocking provided in the implementations of the present disclosure, a fingerprint recognition sensor is divided into a plurality of scanning partitions, a finger of a user is scanned by utilizing the scanning partitions in descending order of the matching priority, so as to acquire feature points of the finger and then update a current feature point set. The number of sensing electrodes in each scanning partition is greater than a first preset threshold; in such way, it is capable of acquiring enough feature points for subsequent matching by scanning the finger by each scanning partition. Compared with a solution of scanning the finger by means of all regions of the fingerprint recognition sensor in the related art, in the method provided herein, the area of the scanning partition is reduced, and time consumed for scanning is correspondingly shortened, thereby facilitating improvement of the unlocking speed of the terminal and improving user experience.

Figure 5:
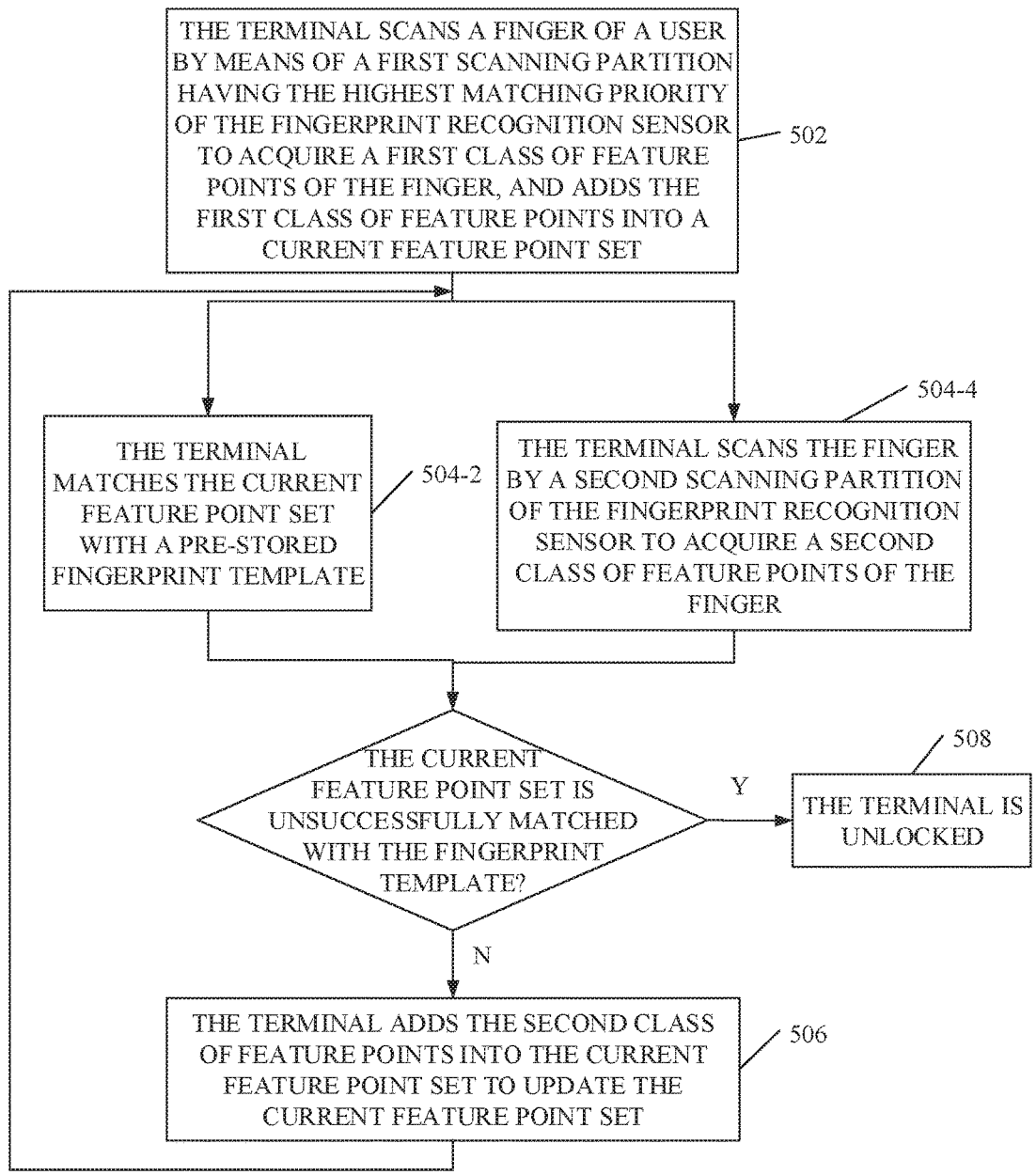
FIG. 5 is a flowchart illustrating an example of the method for controlling unlocking according to an implementation of the present disclosure.

FIG. 5 is a flowchart illustrating an example of the method for controlling unlocking according to an implementation of the present disclosure. As illustrated in FIG. 5, the method can begin at block 502.

At block 502, when a touch operation on a fingerprint recognition sensor of a terminal is detected, the terminal scans a finger of a user by means of a first scanning partition having the highest priority of the fingerprint recognition sensor to acquire a first class of feature points of the finger, and adds the first class of feature points into a current feature point set. The finger referred to herein is the finger presses or touches the fingerprint recognition sensor.

At block 504, the terminal matches the current feature point set with a pre-stored fingerprint template (504-2), and scans the finger by means of a second scanning partition of the fingerprint recognition sensor to acquire a second class of feature points of the finger (504-4). The first scanning partition has a matching priority higher than that of the second scanning partition.

At block 506, when the current feature point set is unsuccessfully matched with the fingerprint template, the terminal adds the second class of feature points into the current feature point set to update the current feature point set.

At block 508, when the current feature point set is successfully matched with the fingerprint template, the terminal is unlocked.

As can be seen, in the method illustrated in FIG. 5, feature point matching and feature point acquisition are executed in parallel, when unlocking through the first scanning partition fails, the terminal does not need to take additional time in executing the process of acquiring feature points through the second scanning partition, thereby increasing the unlocking speed.

An apparatus implementation regarding a terminal of the present disclosure is provided herein below.

Figure 6:
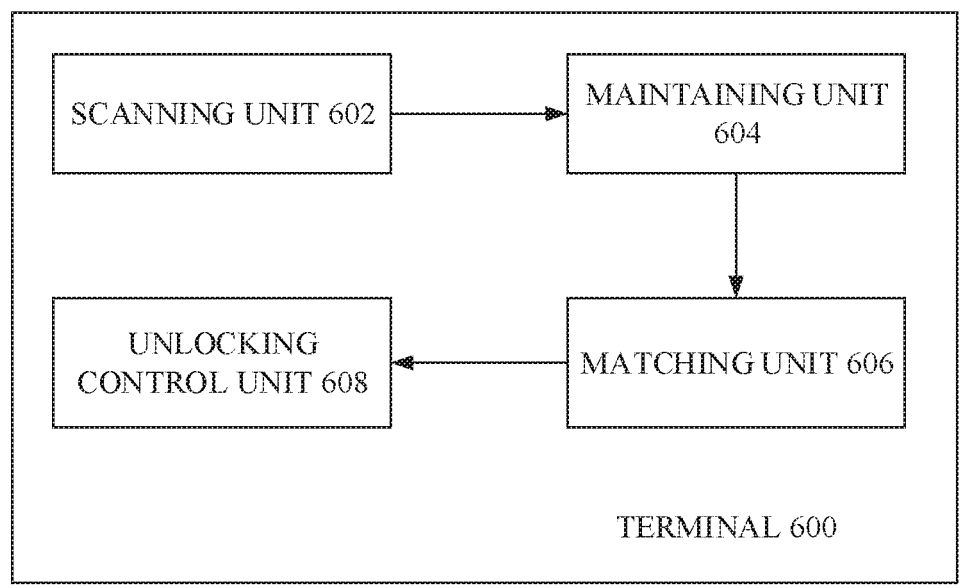
FIG. 6 is a block diagram illustrating a terminal according to an implementation of the present disclosure.

The terminal of the present disclosure can be used for executing the method illustrated in the foregoing method implementations of the present disclosure. As illustrated in FIG. 6, the terminal 600 may include a scanning unit 602, a maintaining unit 604, a matching unit 606, and an unlocking control unit 608.

The scanning unit 602 has M scanning partitions, and is configured to scan the finger with the $i^{th}$ scanning partition of the scanning unit to acquire feature points of class i of a finger of a user, M being a positive integer not less than 2 and i being a positive integer not greater than M. In actual practice, the scanning unit 602 can be a fingerprint recognition sensor (also known as fingerprint recognition module). As one implementation, each of the M scanning partitions has a plurality of sensing electrodes, the number of which is greater than a default threshold.

As one implementation, the scanning unit 602 configured to scan the finger with the $i^{th}$ scanning partition of the scanning unit to acquire feature points of class i is further configured to: obtain fingerprint data by scanning the finger with the $i^{th}$ scanning partition, generate a fingerprint image according to the fingerprint data, and extract feature points of the fingerprint image as the feature points of class i.

Furthermore, the scanning unit 602 configured to obtain the fingerprint data is further configured to: acquire n1 underlying data by n1 normal sensing electrodes of the $i^{th}$ scanning partition, n2 and n1 being positive integers; determine n2 reference underlying data corresponding to n2 abnormal sensing electrodes of the $i^{th}$ scanning partition according to the n1 underlying data; obtain the fingerprint data on the basis of the n2 reference underlying data and the n1 underlying data.

The maintaining unit 604 is configured to add the feature points of class i into a current feature point set. The current feature point set is configured to maintain feature points acquired in this current unlocking control process, and can be set to null at the beginning.

The matching unit 606 is configured to match the current feature point set with a pre-stored fingerprint template. The fingerprint template can be pre-stored in a memory 612 illustrated in FIG. 7. One example of the fingerprint template is illustrated in FIG. 10.

The unlocking control unit 608 is configured to unlock the terminal when the current feature point set is matched with the pre-stored fingerprint template.

In at least one implementation, the matching unit 606 is further configured to trigger the scanning unit 602 to scan the finger with the $(i+1)^{th}$ scanning partition during a matching process, or trigger the scanning unit 602 to scan the finger with the $(i+1)^{th}$ scanning partition when the current feature point set is not matched with the pre-stored fingerprint template.

Figure 7:
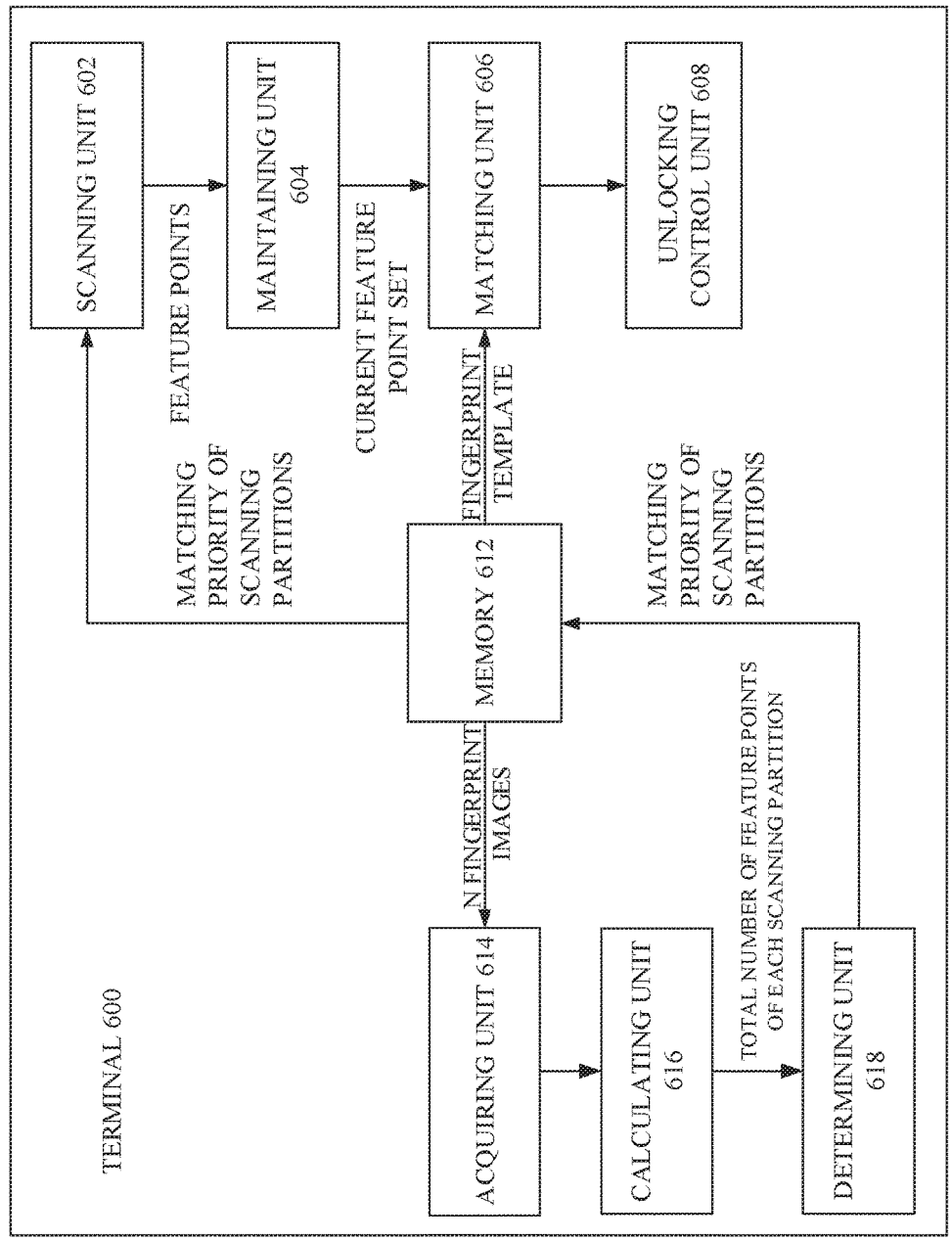
FIG. 7 is a detailed block diagram illustrating a terminal according to an implementation of the present disclosure.

As illustrated in FIG. 7, the terminal 600 can further includes an acquiring unit 614, a calculating unit 616, and a determining unit 618; these components are cooperated to determine a matching priority of each scanning partition.

The acquiring unit 614 is configured to acquire, for example, form the memory 612, N fingerprint images that unlocked the terminal successfully for N times, each fingerprint image has M local fingerprint images corresponding to the M scanning partitions, N is a positive integer. The calculating unit 616 is configured to calculate, for each of the M scanning partitions, the total number of feature points in N local fingerprint images of the N fingerprint images. The determining unit 618 is configured to determine the matching priority of each of the M scanning partitions according to the total number of feature points corresponding thereto, and return the matching priority to the memory 612. While the determining unit 618 is illustrated to be connected with the memory 612 in FIG. 7, however, the determining unit 618 can be connected and communicated with the scanning unit 602 directly.

It is important to note that, the terminal described in the apparatus implementation of the present disclosure is presented in the form of functional units. The term "unit" used herein should be understood as a meaning as wide as possible, and an object for implementing the described function of each "unit" may be, for example, an integrated circuit ASIC, a single circuit, a processor (shared, dedicated, or chip group) for executing one or more software or firmware programs, a memory, a combined logic circuit, and/or other proper assemblies for implementing the above-mentioned function.

By means of the terminal of the implementation, the scanning unit, which has a plurality of scanning partitions with different matching priorities, can be used to scan a finger of a user with one scanning partition each time to acquire feature points of the finger. The scanning partitions being used to scan the finger will generally have higher priority than those remained scanning partition which is/are not selected for scanning. Since the scanning partition that is more likely to acquire feature points that are readily matched with a pre-stored fingerprint template is used first, compared with the related art in which the whole or mostly available fingerprint recognition sensor is used to scan the finger, unlocking time of a terminal can be shortened.

Figure 8:
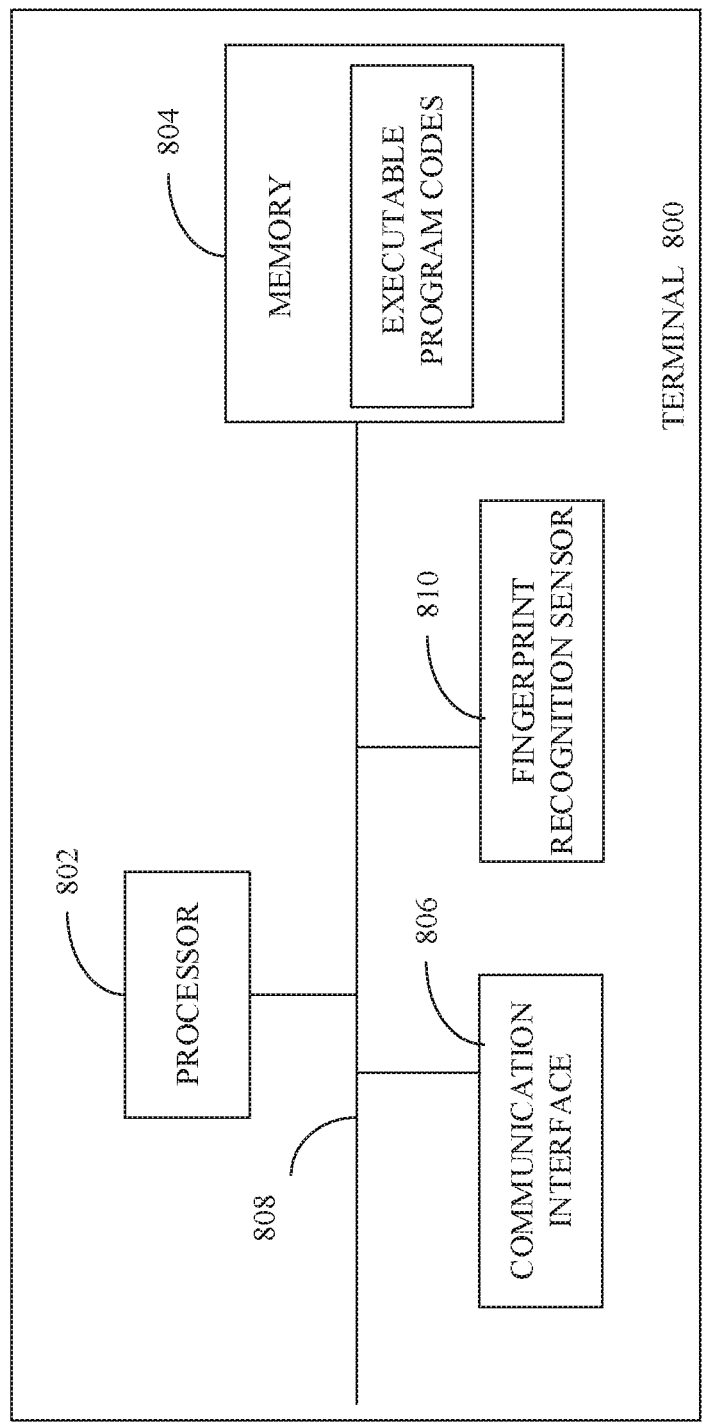
FIG. 8 is a structure schematic diagram illustrating a terminal according to an implementation of the present disclosure.

According to an implementation of the present disclosure, there is provided another terminal. As illustrated in FIG. 8, a terminal 800 includes: a processor 802, a memory 804, a communication interface 806, a communication bus 808 and a fingerprint recognition sensor 810. For example, the matching unit 606 for matching the current feature point set with the pre-stored fingerprint template may be implemented via the terminal as illustrated in FIG. 8. As illustrated in FIG. 8, the processor 802 can invoke a fingerprint template pre-stored in the memory 804 and match the current feature point set with the fingerprint template.

The processor 802, the memory 804, the fingerprint recognition sensor 810, and the communication interface 806 are connected and communicated via the communication bus 808. The processor 802 may be one of a central processing unit (CPU), a micro-processor, an application-specific integrated circuit (ASIC), or one or more integrated circuits for controlling the programs for the implementation of above-mentioned technical solutions, and controls wireless communication with an external cellular network via the communication interface 806. The communication interface 806 includes, but is not limited to, an antenna, an amplifier, a transceiver, a coupler, a low noise amplifier (LNA), a duplexer and so on, and is configured to communicate with other devices or communication networks such as Ethernet, radio access network (RAN), wireless local area network (WLAN) and the like. The fingerprint recognition sensor 610 is configured to acquire fingerprint data of a finger of a user. The memory 804 includes at least one of a random access memory (RAM), a non-volatile memory, and an external memory, the memory 804 is configured to store executable program codes that executes the above-mentioned technical schemes and is controlled by the processor 802. The executable program codes can guide the processor 802 to execute the method for controlling unlocking disclosed in the method implementation with reference to any of FIG. 1-FIG. 5 of the present disclosure, which will not be repeated here. The memory 804 can exist independently and connect to the processor 802 via the communication bus 808. The memory 804 can also be integrated with the processor 802

Figure 9:
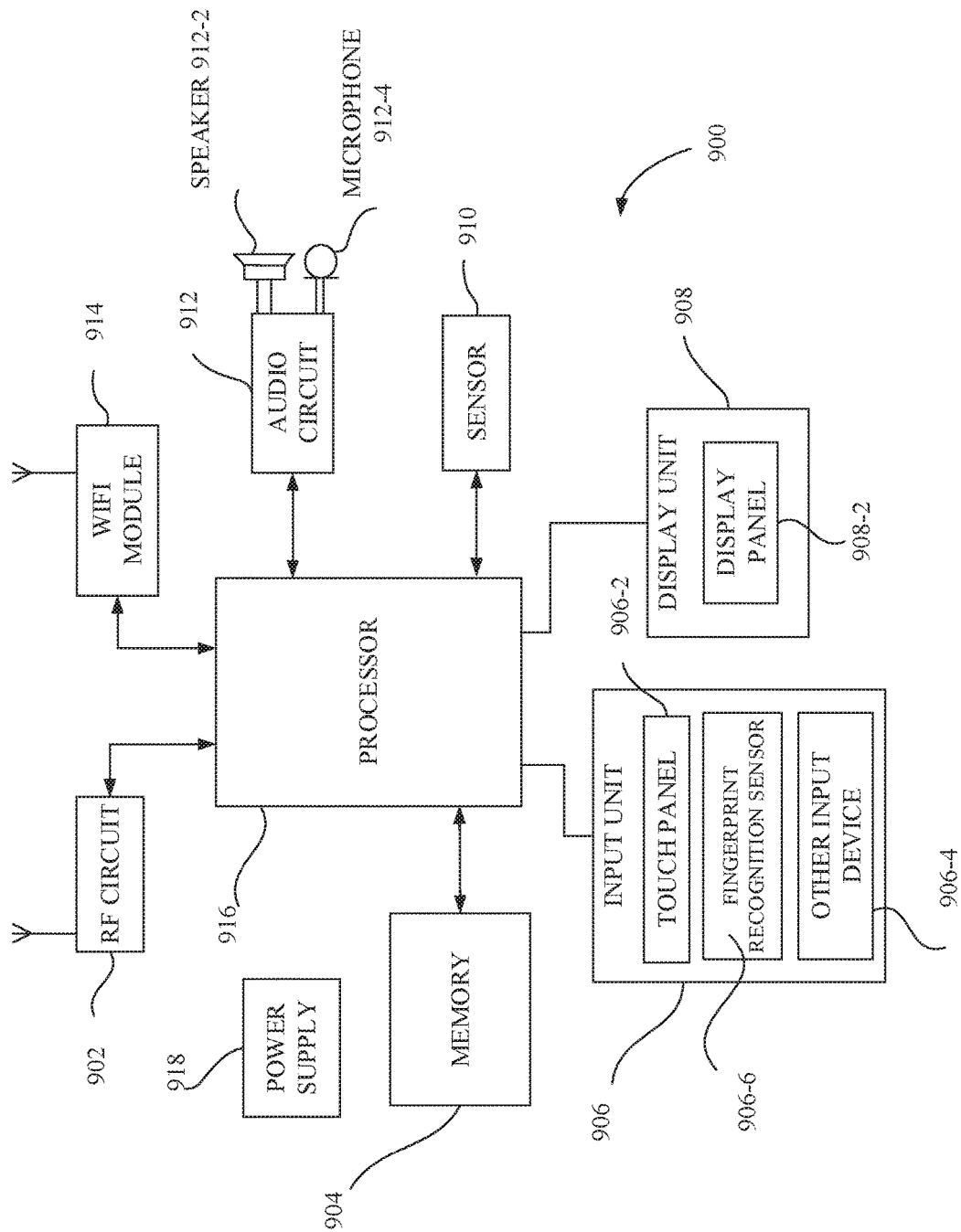
FIG. 9 is a structure schematic diagram illustrating another terminal according to an implementation of the present disclosure.

The implementation of the present disclosure further provides a more specific application scenario in which the terminal is a mobile phone and the following describes components of the mobile phone in detail with refer to FIG. 9.

As illustrated in FIG. 9, a mobile phone 900 can includes a RF (radio frequency) circuit 902, a memory 904, an input unit 906, a display unit 908, a sensor 910, an audio circuit 912, a Wi-Fi module 914, a processor 916, and a power supply 918. The input unit 906 further includes a touch panel 906-2, other input devices 906-4, and a fingerprint recognition sensor 906-6. The display unit 908 includes a display panel 908-2. The audio circuit 912 is connected with a speaker 912-2 and a microphone 912-4.

The RF circuit 902 is configured for receiving and transmitting signals or transmitting or receiving information during a call, and in particular, receiving downlink information of a base station and transferring the downlink information to the processor 916 for processing, and transmitting uplink data to the base station. Generally, the RF circuit 902 includes but not limited to an antenna, at least one amplifier, a transceiver, coupler, low noise amplifier (LNA), duplexer and the like. In addition, the RF circuit 902 may also communicate with the network and other devices by wireless communication. The above wireless communication may use any communication standard or protocol, which includes but not limited to Global System of mobile communication (GSM), general packet radio service (GPRS), code division multiple access (CDMA), wideband code division multiple access (WCDMA), long term evolution (LTE), E-mail, short messaging service (SMS) and so on.

The memory 904 may be configured to store software programs and modules, and the processor 916 executes various function applications and data processing of the mobile phone by running the software programs and the modules stored in the memory 904. The memory 904 may mainly include a program storage region and a data storage region, the storage program region may store an operation system, application programs for at least one function (a fingerprint scanning function, a fingerprint matching function, and an unlocking function) and so on; and the data storage region may store data (such as fingerprint data received by a fingerprint recognition sensor, underlying data for storing a fingerprint image received) created according to use of the mobile phone, and so on. In addition, the memory 904 may include a high-speed RAM, and may further include a non-volatile memory such as one of at least a disk storage device, a flash device, or other non-volatile solid storage devices.

The input unit 906 may be configured to receive input digital or character information and generate key signal input associated with user setting and functional control of the mobile phone. Specifically, the input unit 906 may include a touch panel 906-2, other input devices 906-4 and a fingerprint recognition sensor 906-6. The touch panel 906-2, also referred to as a touch screen, may receive a touch operation of the user thereon or nearby (e.g., operation on or near the touch panel 906-2 by a user using a finger or stylus, or any suitable object or attachment), and drive a corresponding connection device according to a pre-set program. The touch panel 906-2 may include a touch detection device and a touch controller. The touch detection device detects the touching position of the user and detects a signal resulted from the touch operation, and transmits the signal to the touch controller. The touch controller receives the touch information from the touch detection device and converts the information into contact coordinates and sends it to the processor 916, the touch controller can receive and execute the command sent by the processor 916. In addition, the touch panel 906-2 can be realized using various types such as resistive, capacitive, infrared, and surface acoustic waves. In addition to the touch panel 906-2, the input unit 906 may still include other input devices 906-4. The other input devices 906-4 may include, but is not limited to, at least one of a physical keyboard, a function key (such as volume control buttons, switch buttons and so on), a trackball, a mouse, and a joystick. The fingerprint recognition sensor 906-6 may be provided in conjunction with the dome key of the terminal or can be provided in combination with the touch panel 906-2. For example, the fingerprint recognition sensor 906-6 is provided below the touch panel 906-2, when a finger of the user touches the touch panel of the terminal, the fingerprint recognition sensor 906-6 below the touch panel 906-2 can receive a fingerprint image of the finger of the user.

The display unit 908 may be configured to display information input by the user or information provided for the user or various menus of the mobile phone. The display unit 908 may include a display panel 908-2, and alternatively, the display panel 908-2 may be configured in the form of a liquid crystal display (LCD), an organic light-emitting diode (OLED) and so on. Further, the touch panel 906-2 may cover the display panel 908-2. When the touch panel 906-2 detects a touch operation (touch event) thereon or nearby, information of the touch operation can be transmitted to the processor 916 so as to determine the type of the touch event. The processor 916 provides corresponding visual output on the display panel 908-2 according to the type of the touch event. Although in FIG. 9, the touch panel 906-2 and the display panel 908-2 are used as two separate components to realize the input and output functions of the mobile phone, in some implementations, the touch panel 906-2 may be integrated with the display panel 908-2 to implement the input and output functions of the mobile phone.

The mobile phone may also include at least one sensor 910, such as a light sensor, a motion sensor, and other sensors. Specifically, the light sensor may include an ambient light sensor and a proximity sensor, among which the ambient light sensor may adjust the brightness of the display panel 908-2 according to ambient lights, and the proximity sensor may turn off the display panel 908-2 and/or backlight when the mobile phone reaches nearby the ear. As a kind of motion sensor, the accelerometer sensor can detect the magnitude of acceleration in all directions (typically three axes, that is, x, y, and z); when stationary, the accelerometer sensor can detect the magnitude and direction of gravity when stationary; the accelerometer sensor can also identify the application of mobile gestures (such as vertical and horizontal screen switch, related games, magnetometer attitude calibration), or the accelerometer sensor can be used for vibration recognition of related functions (such as a pedometer, percussion) and so on. The mobile phone can also be equipped with a gyroscope, barometer, hygrometer, thermometer, infrared sensor and other sensors, and will not repeat here.

The audio circuit 912, the speaker 912-2, the microphone 912-4 may provide an audio interface between the user and the terminal. The audio circuit 912 may convert the received audio data into electrical data and transfer the electrical data to the speaker 912-2; thereafter the speaker 912-2 converts the electrical data into a sound signal for output. On the other hand, the microphone 912-4 converts the received sound signal into an electrical signal which will be received by the audio circuit 912 and converted into audio data to output to the processor 916, the audio data is processed by the processor 916 and transmitted via an RF circuit 902 to, for example, another mobile phone, or, the audio data is output to the memory 904 for further processing.

Wi-Fi belongs to a short-range wireless transmission technology, the mobile phone may assist the user in E-mail receiving and sending, webpage browsing, access to streaming media and the like by means of the Wi-Fi module 914; Wi-Fi provides users with wireless broadband Internet access. Although illustrated in FIG. 9, it should be understood that the Wi-Fi module 914 is not a necessary part of the mobile phone and can be omitted according to actual needs without departing from the essential nature of the present disclosure.

The processor 916 is the control center of the mobile phone, it uses various interfaces and lines to connect various parts of the mobile phone, runs or executes software programs and/or modules stored in the memory 904, and calls data stored in the memory 904 to perform various functions of the mobile phone and process data, thereby monitoring the mobile phone. In at least one implementation, the processor 916 may include one or more processing units; for example, the processor 916 may integrate an application processor and a modem processor, wherein the application processor handles the operating system, the user interface, the application, and so on, and the modem processor mainly processes wireless communication. It will be appreciated that the above-mentioned modem processor may not be integrated into the processor 916.

The mobile phone also includes a power supply 918 (e.g., a battery) that supplies power to various components. For instance, the power supply 918 may be logically connected to the processor 916 via a power management system to enable management of charging, discharging, and power consumption through the power management system. Although not illustrated, the mobile phone may include a camera, a Bluetooth module, etc., and will not be elaborated here. The method of the foregoing implementations can be realized based on the configuration of the terminal illustrated in FIG. 9.

The implementation of the present disclosure also provides a computer readable storage medium. The computer readable storage medium may store a program which, when executed, can accomplish all or part of the steps of the unlocking method described in the above-described method implementation.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the implementations described in the specification are exemplary implementations and the actions and modules involved are not necessarily necessary for the present disclosure.

The apparatus disclosed in implementations provided herein may be implemented in other manners. For example, the device/apparatus implementations described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the implementations. In addition, the functional units in various implementations of the present disclosure may be integrated in one processing unit, or each unit may be physically present, or two or more units may be integrated in one unit.

The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or CD, and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for controlling unlocking, comprising:
   acquiring feature points of class i of a finger of a user by scanning the finger with the $i^{th}$ scanning partition of a fingerprint recognition sensor of a terminal, the fingerprint recognition sensor comprising M scanning partitions, M being a positive integer not less than 2 and i being a positive integer not greater than M;
   adding the feature points of class i into a current feature point set;
   matching the current feature point set with a pre-stored fingerprint template;
   unlocking the terminal when the current feature point set is matched with the pre-stored fingerprint template;
   acquiring feature points of class i+1 of the finger by scanning the finger with the $(i+1)^{th}$ scanning partition of the fingerprint recognition sensor, wherein the $i^{th}$ scanning partition has a higher matching priority than the $(i+1)^{th}$ scanning partition, wherein the acquiring the feature points of class i+1 is performed during the matching of the current feature point set updated with the feature points of class i; and
   adding the feature points of class i+1 into the current feature point set.

2. The method of claim 1, wherein each of the M scanning partitions has a plurality of sensing electrodes, and a number of the plurality of sensing electrodes is greater than a preset threshold.

3. The method of claim 1, further comprising:
   prior to acquiring the feature points of class i, acquiring N fingerprint images that unlocked the terminal successfully for N times, each fingerprint image comprising M local fingerprint images corresponding to the M scanning partitions, N being a positive integer;
   for each of the M scanning partitions, determining the total number of feature points in N local fingerprint images of the N fingerprint images; and determining matching priority for each of the M scanning partitions based on the total number of feature points corresponding to the each of the M scanning partitions.

4. The method of claim 1, wherein acquiring the feature points of class i of the finger of the user by scanning the finger with the $i^{th}$ scanning partition of the fingerprint recognition sensor of the terminal comprises:
obtaining fingerprint data by scanning the finger with the $i^{th}$ scanning partition;
generating a fingerprint image according to the fingerprint data; and
extracting feature points of the fingerprint image as the feature points of class i.

5. The method of claim 4, wherein obtaining the fingerprint data by scanning the finger with the $i^{th}$ scanning partition comprises:
acquiring n1 underlying data by n1 normal sensing electrodes of the $i^{th}$ scanning partition;
determining n2 reference underlying data corresponding to n2 abnormal sensing electrodes of the $i^{th}$ scanning partition according to the n1 underlying data, n1 and n2 being positive integers; and
obtaining the fingerprint data based on the n2 reference underlying data and the n1 underlying data.

6. A terminal, comprising:
a fingerprint recognition sensor comprising M scanning partitions, configured to scan a finger of a user with the $i^{th}$ scanning partition to acquire feature points of class i of the finger, M being a positive integer not less than 2 and i being a positive integer not greater than M;
a processor; and
a memory configured to store programs which, when executed by the processor, cause the processor to:
add the feature points of class i into a current feature point set;
match the current feature point set with a pre-stored fingerprint template; and
unlock the terminal when the current feature point set is matched with the pre-stored fingerprint template;
wherein the programs further cause the processor to:
acquire N fingerprint images that unlocked the terminal successfully for N times, each fingerprint image comprising M local fingerprint images corresponding to the M scanning partitions, N being a positive integer;
calculate, for each of the M scanning partitions, the total number of feature points in N local fingerprint images of the N fingerprint images; and
determine matching priority of each of the M scanning partitions based on the total number of feature points corresponding to the each of the M scanning partitions.

7. The terminal of claim 6, wherein
the fingerprint recognition sensor is further configured to scan the finger with the $(i+1)^{th}$ scanning partition to acquire feature points of class i+1 of the finger, the $i^{th}$ scanning partition has a higher matching priority than the $(i+1)^{th}$ scanning partition; and
the programs further cause the processor to add the feature points of class i+1 into the current feature point set.

8. The terminal of claim 7, wherein the programs further cause the processor to trigger the fingerprint recognition sensor to scan the finger with the $(i+1)^{th}$ scanning partition during a matching process, or trigger the fingerprint recognition sensor to scan the finger with the $(i+1)^{th}$ scanning partition when the current feature point set updated by the feature points of class i is not matched with the pre-stored fingerprint template.

9. The terminal of claim 7, wherein each of the M scanning partitions has a plurality of sensing electrodes, and a number of the plurality of sensing electrodes is greater than a preset threshold.

10. The terminal of claim 6, wherein the fingerprint recognition sensor canning unit configured to scan the finger with the $i^{th}$ scanning partition to acquire feature points of class i is further configured to:
obtain fingerprint data by scanning the finger with the $i^{th}$ scanning partition;
generate a fingerprint image according to the fingerprint data; and
extract feature points of the fingerprint image as the feature points of class i.

11. The terminal of claim 10, wherein the fingerprint recognition sensor configured to obtain the fingerprint data is further configured to:
acquire n1 underlying data by n1 normal sensing electrodes of the $i^{th}$ scanning partition, n2 and n1 being positive integers;
determine n2 reference underlying data corresponding to n2 abnormal sensing electrodes of the $i^{th}$ scanning partition according to the n1 underlying data; and
obtain the fingerprint data based on the n2 reference underlying data and the n1 underlying data.

12. A method for controlling unlocking of a terminal, comprising:
scanning a finger of a user using a first scanning partition having the highest matching priority of a fingerprint recognition sensor of a terminal to acquire a first set of feature points, wherein the fingerprint recognition sensor comprises at least two scanning partitions;
adding the first set of feature points to a current feature point set;
matching the current feature point set with a pre-stored fingerprint template; and
unlocking the terminal when the current feature point set is matched with the pre-stored fingerprint template;
wherein priority of a scanning partition is determined according to the total number of feature points in a plurality of local fingerprint image corresponding to the scanning partition in a plurality of fingerprint images.

13. The method of claim 12, further comprising:
scanning the finger using a second scanning partition having a second matching priority lower than a first matching priority to acquire a second set of feature points; and
adding the second set of feature points to the current feature point set.

14. The method of claim 13, wherein the scanning the finger using the second scanning partition is performed when the current feature point updated with the first set of feature points is not matched with the pre-stored fingerprint template.

15. The method of claim 13, wherein the scanning the finger using the second scanning partition is performed in parallel with the matching of the current feature point set updated with the first set of feature points.

* * * * *